Sept. 2, 1969   C. J. AMMONDSON ET AL   3,464,692
COMBINATION RESILIENT SHELL FILLED WITH SOLIDIFIED DENSE
MATERIAL AND SEALING PLUG
Filed July 22, 1965   2 Sheets-Sheet 1

INVENTORS
Clayton J. Ammondson
Eldridge H. Cockrell
Ira J. Silberman
Forrest H. James, Jr.

BY *Newton, Hopkins, Jones & Ormsby*

ATTORNEYS

United States Patent Office 3,464,692
Patented Sept. 2, 1969

3,464,692
COMBINATION RESILIENT SHELL FILLED WITH SOLIDIFIED DENSE MATERIAL AND SEALING PLUG
Clayton J. Ammondson, Reidsville, N.C., and Eldridge H. Cockrell, Auburn, and Ira J. Silberman and Forrest H. James, Jr., Opelika, Ala., assignors to Diversified Products Corporation, Opelika, Ala., a corporation of Alabama
Continuation-in-part of application Ser. No. 395,693, Sept. 11, 1964. This application July 22, 1965, Ser. No. 474,019
Int. Cl. A63b *21/00, 37/04, 11/00*
U.S. Cl. 272—84                             5 Claims

ABSTRACT OF THE DISCLOSURE

A hollow plastic body filled with solidified dense material, the plastic body having a filling hole through which the dense material was initially inserted, and a plug projecting through the hole and into the dense material whereby the dense material anchors the plug in place in the shell.

---

The joint application is a continuation-in-part of the sole application of Forrest H. James, Jr., Ser. No. 395,693, filed Sept. 11, 1964, for "Dumbbell and Means for Filling the Same," now abandoned.

This joint application is a continuation-in-part of the bodies filled with solidified material and is more particularly concerned with a combination hollow resilient shell filled with solidified material and sealing plug.

In the past, barbells and dumbbells have been produced wherein the shell thereof was formed from the blow molding of polyethylene into a prescribed shape and the filling through a filling hole of the hollow interior of the shell with a dense aggregate material which, upon setting up, becomes solidified. It is important that the finished barbell or dumbbell present a pleasing appearance and the filling hole be covered by a plug which can not be removed and which presents a uniform contour with respect to the remainder of the shell. The plug must also effectively close the filling hole since excess aggregate material is usually washed from the barbell or dumbbell after the same has been filled. Furthermore, the plug should not trap any appreciable amount of air within the interior of the plastic shell or housing since it is desirable that the finished product have a uniform weight which is symmetrically distributed throughout its area.

Accordingly it is an object of the present invention to provide a plug for a hollow body, the plug being easy to install and effective for sealing the hole through which it projects.

Another object of the present invention is to provide closure for a hollow body, the closure being inexpensive to manufacture, variable in structure, and efficient in operation.

Another object of the present invention is to provide a plug for a hollow body which contains within the hollow portion thereof material which subsequently solidifies, the plug having a configuration which enables the solidified material therein to maintain the plug in position.

Another object of the present invention is to provide a closure for a hollow body, the plug being formed of a plastic material and the closure having a configuration which lends itself readily to being blow molded or injection molded.

Another object of the present invention is to provide a plug for a hollow body, the plug being capable of being seated in proper place readily and easily by an unskilled workman.

Another object of the present invention is to provide a plug for a hollow body which when seated properly, effectively closes the opening through which it projects so as to prevent the ingress and egress of liquids thereby.

Other objects, features, and advantages of the present invention will become apparent from the following description when taken in conjunction with the accompanying drawings wherein like characters of reference designated corresponding parts throughout the views and, wherein.

Figure 1:
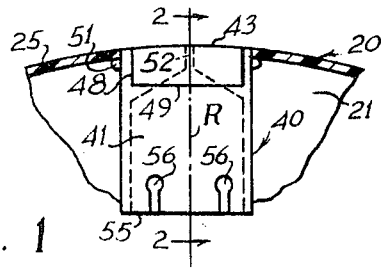
FIG. 1 is a fragmentary vertical sectional view of a hollow body having aggregate material therein and receiving one form of plug produced according to the present invention through the filling opening of the hollow body.

Referring now in detail to the embodiments chosen for the purpose of illustrating the present invention, it being understood that in its broader aspects, the present invention is not limited to the exact details herein depicted, numeral 20 in FIGS. 1, 2, 3, and 4 denotes generally the hollow blow molded plastic body, housing, or shell of a disc-shaped weight which is received on a steel bar (not shown) as a weight therefore. Such a weight is illustrated in detail in U.S. Patent No. 3,171,652, and therefore no more detailed showing of the weight is required. Suffice it to state that the shell or body 20 receives within the entire hollow portion thereof, aggregate material 21 which, upon setting up, becomes solidified. The aggregate material 21 fills the entire void or hollow portion of the shell or body 20, the material in fluid form being received through a single opening 22 in the periphery of the hollow body or shell 20.

It will be understood by those skilled in the art that the hollow body is of substantially uniform thickness and defines a pair of parallel or outwardly converging spaced opposed circular side walls 23 and 24, the periphery or outer edges of which are joined by an arcuate peripheral outer wall 25 which circumscribes and is integrally formed with the walls 23 and 24.

Adjacent the hole 22, the peripheral wall 25 is interrupted and provided with downwardly extending ledges 27 and 28 which are disposed on opposite sides of a central radius line R of the body 20. The ledges 27 and 28 are disposed parallel to each other and have straight bottom edges which extend between the peripheral edges of the walls 23 and 24. The ledges 27 and 28 are disposed perpendicular to these walls 23 and 24 but the ledges 27 and 28 are spaced apart by a distance less than the diameter of the hole 22. Therefore, while the ledges 27 and 28 initially, or prior to the formation of the hole 22, extend across from wall 23 to wall 24 in a continuous manner, after the hole 22 is produced, the ledge 27 is separated into two segments divided by a cord of the hole 22 and the ledge 28 is separated into two segments divided by an opposite cord of the hole 22. Thus, each ledge, such as ledge 27 is separated into two rectangular shaped fillets 28 and 29, as seen in FIG. 3.

Extending between the lower edges of the ledges 27 and 28 and between the peripheral edges of the walls 23 and 24 is a flat base plate 30 which initially is a continuous base plate but when the hole 22 is formed therein, is separated into complementary opposed inwardly extending flanges 31 and 32, the inner surfaces of which define with the inner surfaces of the wall 25 and the surfaces of the ledges 27 and 28, the circular hole or aperture 22.

Figure 3:
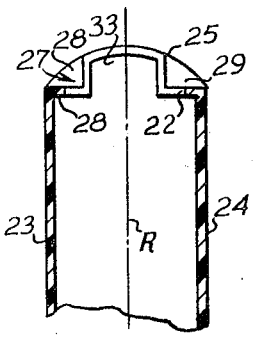
FIG. 3 is a view similar to FIG. 2 but showing the plug of the present invention removed from the hollow body.
Figure 4:
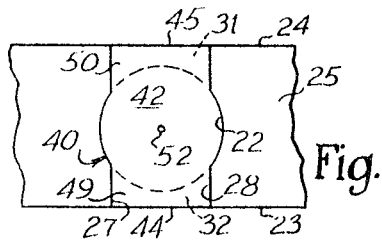
FIG. 4 is a plan view of that portion of the structure illustrated in FIG. 1.

It is therefore seen that the hole 22 is defined in part by a pair of opposed inverted U-shaped channels, such as channel 33 in FIG. 3, through which air may exit from the hole as the fluid aggregate material is added thus resulting in a completely filled shell.

Figure 2:
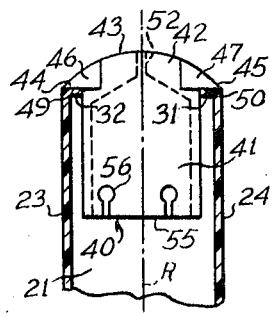
FIG. 2 is a cross-sectional view taken substantially along line 2—2 in FIG. 1.

The plug, denoted generally by numeral 40 which is received in the hole 22 after the shell or casing 20 has been filled with the aggregate material, includes a cylindrical body portion 41 and a cap portion 42 connected to one end of the cylindrical body portion 41. The cap portion 42 has an arcuate upper surface 43 which corresponds to the curvature of the peripheral wall 25 of the shell 20 and merges therewith when the plug 40 is seated in the hole 22, as illustrated in FIGS. 1 and 2. As viewed from the top or the bottom, the cap 42 is generally rectangular in shape, the transverse length from edge 44 to edge 45 of the cap being equal to the distance from the outside surface of wall 23 to the outside surface of wall 24 and being greater than the diameter of the body portion 41. Longitudinally, however, the cap portion 42 is of less width than the diameter of the body portion 41 and, therefore, the cylindrical surface of the body portion 41 continues upwardly on the sides of cap 42 to form the sides thereof, except for small rectangular shaped vertical surfaces, such as surfaces 46, 47 and 48 adjacent the corners of the cap 42.

It is therefore seen that when the plug 40 is inserted through the hole 22, the inward movement of the plug 40 is arrested by the opposed shoulders 49 and 50 which come to rest on the flanges 31 and 32.

Mounted on the curved portion of the cap portion 42 of the plug 40, which is an extension of the body portion, are keeper flanges 51, these flanges being spaced below the top of the plug by approximately the thickness of the shell or body 20. The function of the retaining or keeper flanges 51 is to retain the plug in a completely seated position so that it may not readily be dislodged, once the plug is fully seated.

It will be observed in FIGS. 1 and 2 that the body portion 41 is essentially a hollow tubular, preferably cylindrical member which defines with the cap portion 42 a cavity defined by the broken lines in FIGS. 1 and 2. Along the axis or radius R of the cap, a hole 52 is drilled from the central portion of cap portion 42 into the cavity defined by the plug 40. This permits the plug to breathe or to exhaust air as the plug is seated. Thus, no appreciable pressure is built up within the cavity of plug 40.

The lower edge 55 of the body portion 41 is essentially straight, being essentially perpendicular to the axis of the plug; however, a plurality of inwardly extending downwardly opening slots which, in the present embodiment are keyhole shaped slots 56, are provided so that the aggregate material 21 may be received therein to aid in preventing the inadvertent removal of the plug, once the aggregate material has solidified.

Referring now to FIGS. 5 through 8, the first modification, or second embodiment of the present invention, includes a body 120 having aggregate material 121 therein, the body 120 and the aggregate material 121 being substantially identical to the body 20 and the aggregate material 21, except as will be hereinafter described. In the second embodiment of our invention, the hole 122 is of smaller diameter than the distance between the ledges 127 and 128 thereof, these ledges being moon-shaped members which project downwardly from the peripheral wall 125 of the body 120. Extending between the inner edges of the ledges 128 and 129 is a base plate 130. The hole 122 is defined entirely by the base plate 130. The hole 122 is preferably a cylindrical hole.

Figure 6:
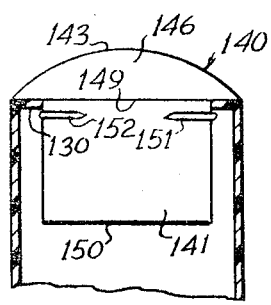
FIG. 6 is a cross-sectional view taken substantially along lines 6—6 in FIG. 5.
Figure 5:
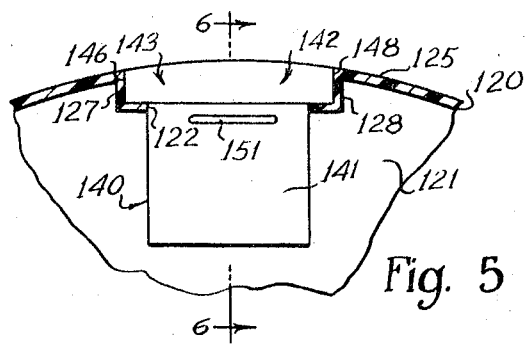
FIG. 5 is a vertical sectional view similar to FIG. 1 but on an enlarged scale and showing a first modification of the hollow body and plug of the present invention.
Figure 7:
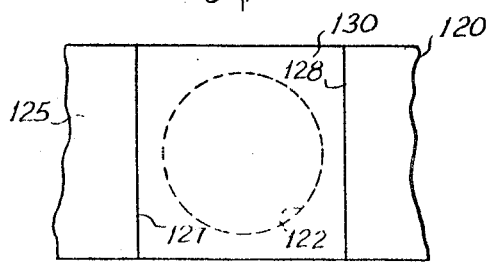
FIG. 7 is a top plan view of that portion of the invention illustrated in FIG. 5.
Figure 8:
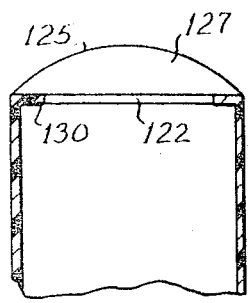
FIG. 8 is a view similar to FIG. 6 but showing the plug removed from the hollow body.

The plug 140, as seen in FIGS. 5 and 6, has a body portion 141 which is a hollow cylindrical member, to one end of which is connected the cap portion or cap 142. The body portion 141 is of less diameter than either the width or the length of the rectangular shaped cap 142. The cap 142 has an arcuate rounded outer surface 143 which conforms to the shape of the peripheral wall 125. At opposite longitudinal ends of the cap 143 there are vertical moon-shaped surfaces 146 and 148 which correspond in shape to the shape of the ledges 127 and 128 respectively. Below the shoulder 149 defined by the cap 142 are the keeper flanges 151 and 152 which are substantially identical to the keeper flanges 51 and 52 of the preceding embodiment. The bottom edge 155 of the body portion 141 of the cap 140 is straight, being perpendicular to the axis of the plug 140.

When the body portion 141 of the plug 140 is inserted through the hole 142, the shoulder 149 comes to rest on the base plate 130, the keeper flanges edging the resilient material of the base plate 130 apart sufficiently to pass thereby and retain the plug 140 in a seated position. The construction shown in FIGS. 1 through 4 has certain advantages over the construction shown in FIGS. 5 through 8, in that the ledges 127 and 128 of FIGS. 5 through 8 tend to trap air within the body 120 while the embodiment of FIGS. 1 through 4 permits this air to escape through the channels such as channel 33.

It will be understood that the plugs 40 and 140 may be readily cast in plastic material similar to the plastic material utilized for the body 20 or 120. Hence, when the plugs 40 and 140 are installed, they tend to give a uniform appearance to the completed weight disc, making the filling hole appear obscure. The solidification of the aggregate material 21 or 121 around the body 40 or 140 will effectively prevent the easy removal of the plug.

Figure 9:
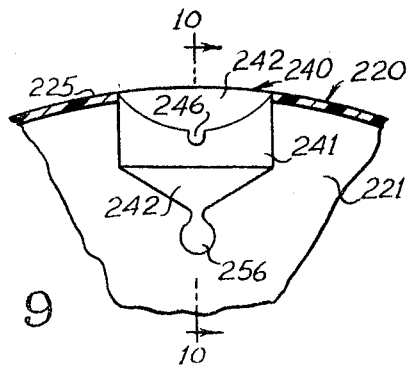
FIG. 9 is a view similar to FIGS. 1 and 5 and showing a second modification of the present invention.
Figure 10:
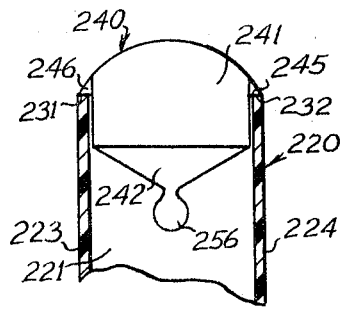
FIG. 10 is a cross-sectional view taken substantially along line 10—10 in FIG. 9.
Figure 11:
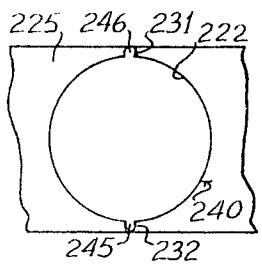
FIG. 11 is a plan view of that portion of the invention illustrated in FIG. 9.

In FIGS. 9 through 11 still another modified form of the present invention is illustrated. In this second modification or third embodiment of the present invention, the body or shell 220 is essentially identical to the body or shells 20 and 120 except that no special provision is made for the opening except to drill a hole 222 in the periphery in the peripheral wall 225 of the body or shell 220. At the outer periphery of the side walls 223 and 224 of the body 220 there are provided concaved recesses 231 and 232 which are disposed in transverse alignment along the radius of the body 220. The plug 240 can be formed by various molding processes, for instance by blow molding, injection molding, etc., and includes a central cylindrical hollow body portion 241 and a downwardly tapering frusto-conical inner end portion 242 which is provided at its apex with a bulbous locking element 256 which protrudes downwardly or outwardly from the frusto-conical bottom 242. The cap portion, at the other end of the plug 240 is curved to conform to the curvature of the peripheral wall 225 of the body 220 while, at the central portion of the body, diametrically opposed ears 245 and 246 protrude outwardly of the plug 240 so as to be received in the recesses 231 and 232 of the body 220, respectively when the plug 240 is seated properly. These ears 245 and 246 prevent further inward movement of the plug and assure the proper seating of the plug.

Figure 12:
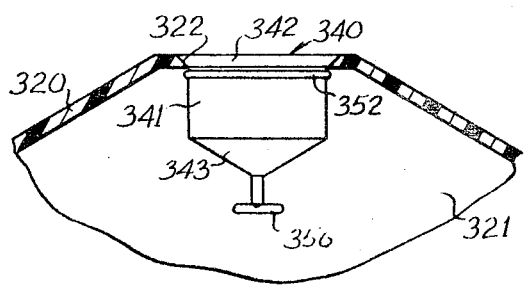
FIG. 12 is a vertical sectional view of one end of a dumbbell, the dumbbell being formed of a hollow body containing aggregate material therein and being closed by a plug constructed in accordance with the present invention, the plug being a third modification of the present invention.

In FIG. 12, still a further modification of the present invention is found. This structure corresponds identically to the plug and seat structure disclosed in application Serial. No. 395,693, and hence no detailed description here is required. The plug 340, illustrated in FIG. 12, is particularly suited for closing the filling hole 322 of the end of a shell or body 320 which is employed to define the shape of a dumbbell, the plug 340 being at one extremity of the dumbbell for closing the opening. The material defining the circular hole or aperture 322 is provided with a taper so that the hole 322 adjacent the inner wall of the shell or body 320 is smaller than the hole adjacent the outer surface of shell or body 320. This inwardly tapering of the hole 322 adapts the body 320 to receive the cap portion or cap 342 of the plug 340, when the plug 340 is properly seated.

The plug 340 includes a hollow cylindrical body portion 341, the lower end of which is integrally joined to a frustoconical inwardly tapered bottom 343, the apex of which is provided with a T-shaped retaining pin 356. At the other end of the plug, the cap 342 is flat, having an inwardly tapered peripheral edge portion, below which is an annular retaining ring or keeper ring 352 which circumscribes and is integrally joined with the periphery of the body portion 341.

When the plug 340 is placed in the opening 322, it may be inserted downwardly or inwardly until the keeper ring contacts the shell or body 320, at which a mallet or the like is employed for driving the keeper ring 352 beyond the inner edge of the material defining the holes 322. Once the keeper ring has passed beyond the inside surface of the body 320, it prevents the inadvertent removal of the plug. Of course, the aggregate material 321 within the shell 320, is in a fluid condition when the plug is inserted through the hole 322 but solidifies upon setting up and therefore prevents the plug from being removed. It will be understood, of course, that since the aggregate material 321 collects between the bottom 343 and the T-shaped lug 356, and solidifies in such a condition, the lug 356 effectively prevents the removal of the plug 340.

In all of the embodiments hereinabove described, it will be understood that once the plug 40, 140, 240, or 340 are inserted and seated properly, the excess aggregate material 21, 121, 221, 321 may be washed from the outer surface of the shells 20, 120, 220, 320 and that the plugs 40, 140, 240, 340 prevent the water employed for washing the bodies 20, 120, 220, 320 from entering into the interior of the body 20, 120, 220, 320. Furthermore, it will be understood that the matching or mating configuration of the various plugs 40, 140, 240, 340 and the area surrounding the hole 22, 122, 222, 322 will assure that the plug can be properly seated with little effort.

In most of the embodiments, the retaining or keeper elements such as the retaining flanges 51, 52, 151, 152, and retaining ring or peripheral flange 352, enable the plug to be seated to an almost fully seated condition and then struck with a mallet or the like for driving the plug to its final seated position. These retaining elements then prevent the inadvertent removal of the plugs.

It will also be apparent to those skilled in the art that the various plugs 40, 140, 240, 340 which have been disclosed herein are well adapted to being produced economically using injection molding or blow molding, as the case may be. While we prefer to employ polyethylene as the plastic from which to produce the plugs, many other plastic materials are suitable for producing these plugs.

It will be obvious to those skilled in the art that many variations may be made in the embodiments here chosen for the purpose of illustrating the present invention without departing from the scope thereof as defined by the appended claims.

We claim:
1. In a weight for a barbell, of the type having an annular flexible resilient container defining a hollow interior containing cementitious material, said weight being formed in the shape of a disc having substantially parallel spaced opposed annular side walls and an arcuate peripheral outer wall joining said side walls, the combination therewith wherein said peripheral outer wall has an indentation at a point along its length forming a pair of spaced apart ledges extending inwardly of said peripheral outer wall, said spaced apart ledges being joined by a flat base plate inwardly of said peripheral outer wall, said flat base plate at least partially defining an aperture therethrough, a plug including a body portion having a cross-sectional shape no greater than and substantially conforming with the shape of said aperture, said body portion projecting into and being partially embedded in said cementitious material, and a cap portion integrally connected to said body portion and being shaped and dimensioned to conform with said ledges and said base plate whereby, when said plug body portion is inserted in said aperture, said cap portion forms with said peripheral wall a continuous surface.

2. A weight comprising a resilient plastic shell defining a hollow interior, and filled with a cementitious material said shell being formed in the shape of a disc and having spaced apart side walls and an annular peripheral wall, joining said side walls said peripheral wall and said side walls having a common indention at a point along their circumferential lengths including a pair of spaced apart ledges extending between said side walls and across said peripheral wall and extending inwardly of said peripheral wall, and a base plate joining said ledges inwardly of said peripheral wall, said base plate at least partially defining an aperture therethrough; and, a plug including a body portion received in said aperture a cap portion connected with said body portion and shaped to form a continuous surface with said peripheral and side walls when said plug is received by said indention and said apertures, and means for engaging said cementitious material to lock said plug in position.

3. A weight as set forth in claim 2 wherein said plug further includes second means for engaging said base plate to retain said plug in position until said cementitious material solidifies.

4. A weight as set forth in claim 3 wherein said second means includes a resilient keeper flange carried by said base plate and received under said base plate when said plug is in position to retain said plug in position.

5. A weight as set forth in claim 2 wherein said ledges, in combination with said base plate, define said aperture.

References Cited

UNITED STATES PATENTS

| 2,935,320 | 5/1960 | Chupa. | |
| 3,171,652 | 3/1965 | Newman | 272—84 |
| 3,176,985 | 4/1965 | Chupa. | |
| 3,226,117 | 12/1965 | Walklet | 272—84 |
| 1,284,207 | 11/1918 | Allshouse | 272—82 |

RICHARD C. PINKHAM, Primary Examiner

W. R. BROWNE, Assistant Examiner